(12) United States Patent
Malve et al.

(10) Patent No.: US 12,422,810 B2
(45) Date of Patent: Sep. 23, 2025

(54) SUPPORT SERVICES FOR PROGRAMMABLE LOGIC DEVICES

(71) Applicant: HEWLETT PACKARD ENTERPRISE DEVELOPMENT LP, Spring, TX (US)

(72) Inventors: Sharath Babu Malve, Karnataka (IN); Jhovel Louie Lopez, Loveland, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 370 days.

(21) Appl. No.: 18/159,838

(22) Filed: Jan. 26, 2023

(65) Prior Publication Data

US 2024/0255914 A1   Aug. 1, 2024

(51) Int. Cl.
G05B 19/05   (2006.01)

(52) U.S. Cl.
CPC .... G05B 19/05 (2013.01); *G05B 2219/13109* (2013.01)

(58) Field of Classification Search
CPC ...................... G05B 19/05; G05B 2219/13109
USPC .......................................................... 700/28
See application file for complete search history.

(56) References Cited

U.S. PATENT DOCUMENTS

| | | | |
|---|---|---|---|
| 2017/0192768 A1* | 7/2017 | Han | G06F 8/71 |
| 2021/0110099 A1* | 4/2021 | Turan | H04L 63/0442 |
| 2021/0319141 A1* | 10/2021 | Rozenberg | H03K 19/1776 |
| 2022/0035956 A1* | 2/2022 | Porter | G06F 21/73 |
| 2022/0198016 A1* | 6/2022 | Lambert | G06F 8/65 |
| 2023/0124610 A1* | 4/2023 | Zhu | G06F 13/4282 700/28 |
| 2023/0214384 A1* | 7/2023 | Kerkes | G06F 16/245 707/769 |

(Continued)

FOREIGN PATENT DOCUMENTS

| | | |
|---|---|---|
| CN | 113190484 A | 7/2021 |
| WO | 2012/171582 A1 | 12/2012 |

OTHER PUBLICATIONS

Philips Semiconductors, "AN262_2 PCA954X Family of I²C / SMBus Multiplexers and Switches", Oct. 27, 2004, 27 pages.

(Continued)

*Primary Examiner* — Md Azad
(74) *Attorney, Agent, or Firm* — Trop, Pruner & Hu, P.C.

(57) ABSTRACT

In some examples, a management controller includes a first interface through which the management controller is to provide a support service for any of a plurality of programmable logic devices in an electronic device. The management controller includes a controller processor to receive a code image to perform a programmable logic device update, where the code image comprises an identifier of a programmable logic device. In response to determining that the identifier corresponds to a given programmable logic device that is present in the electronic device, the management processor sets a multiplexer select value to control a multiplexer to connect the first interface of the management controller to the given programmable logic device. The management processor provides the code image to the given programmable logic device through the first interface and the multiplexer to update the given programmable logic device.

20 Claims, 5 Drawing Sheets

(56) References Cited

U.S. PATENT DOCUMENTS

2024/0211427 A1* 6/2024 Cudak .................. G06F 13/382

OTHER PUBLICATIONS

RandomNerdTutorials.com, "Guide for TCA9548A I2C Multiplexer: ESP32, ESP8266, Arduino", 2022, pp. 1-72 pages.
Wikipedia, JTAG, available online at <https://en.wikipedia.org/w/index.php?title=JTAG&oldid=1127643276>, Dec. 15, 2022, 16 pages.

* cited by examiner

SUPPORT SERVICES FOR PROGRAMMABLE LOGIC DEVICES

BACKGROUND

An electronic device can include a main processor and additional processors or controllers that can perform target tasks. The main processor is to execute an operating system (OS) of the electronic device, application programs, system firmware, and other machine-readable instructions. The other processors and controllers in the electronic device can include a management controller that is used to perform certain management tasks.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

An example of a management controller in an electronic device is a baseboard management controller (BMC). The BMC can perform management tasks to manage components of the electronic device. Examples of management tasks that can be performed by the BMC can include any or some combination of the following: power control to perform power management of the electronic device (such as to transition the electronic device between different power consumption states in response to detected events), thermal monitoring and control of the electronic device (such as to monitor temperatures of the electronic device and to control thermal management states of the electronic device), fan control of fans in the electronic device, system health monitoring based on monitoring measurement data from various sensors of the electronic device, remote access of the electronic device (to access the electronic device over a network, for example), remote reboot of the electronic device (to trigger the electronic system to reboot using a remote command), system setup and deployment of the electronic device, system security to implement security procedures in the electronic device, and so forth.

In some cases, the BMC employs a separate programmable logic device to perform specific functions. Effectively, the specific functions are offloaded from the BMC to the programmable logic device so that the BMC would not be burdened with performing the functions or if the BMC does not have sufficient processing capacity to perform the functions. The programmable logic device can be programmable with machine-readable instructions, such as firmware.

In addition to being able to perform the specific functions, the programmable logic device also provides input/output (I/O) expansion to expand the I/O capacity between the BMC and other components of the electronic device that are managed by the BMC. The BMC can include an I/O interface that has a specific quantity of I/O interface elements (e.g., I/O pins, pads, etc.) that may not be sufficient to interact with other components of the electronic device. The programmable logic device has additional I/O interface elements (e.g., additional I/O pins, pads, etc.) that provide additional signal paths to other components of the electronic device to be managed by the BMC.

The BMC has a support interface, such as a Joint Test Action Group (JTAG) interface, that can be used by the BMC to provide support services for a programmable logic device. The support services can include loading machine-readable instructions (e.g., a firmware image) into the programmable logic device and/or validating machine-readable instructions (e.g., a firmware image) previously loaded into the programmable logic device.

In some cases, it may be desirable to use multiple programmable logic devices with the BMC. The multiple programmable logic devices can provide respective functionalities and can provide further I/O expansion for the BMC. An issue associated with using a support interface such as a JTAG interface to provide support services is that the support interface may not have enough I/O interface elements to interact with multiple programmable logic devices. As a result, the BMC would be unable to provide support services for multiple programmable logic devices through the support interface.

In accordance with some implementations of the present disclosure, techniques or mechanisms are provided to allow a management controller (e.g., a BMC) to selectively control, through a support interface of the management controller, which of multiple programmable logic devices the management controller is to provide support services for. In some examples, the management controller can set a multiplexer select value that controls a multiplexer to connect a support interface of the management controller to any of the multiple programmable logic devices. Different multiplexer select values can control the multiplexer to connect the support interface of the management controller to different programmable logic devices. Once the multiplexer is set to connect a selected programmable logic device to the support interface of the management controller, the management controller can provide a support service to the selected programmable logic device.

The support services can include loading machine-readable instructions into the selected programmable logic device, or validating machine-readable instructions previously loaded into the programmable logic device. Loading machine-readable instructions into a programmable logic device can also be referred to as flashing the programmable logic device. The validation of machine-readable instructions can be performed during a secure start procedure of the BMC and the programmable logic devices, to ensure that the machine-readable instructions of the programmable logic devices have not been corrupted. In further examples, other types of support services can be provided by the BMC with respect to programmable logic devices, such as configuring the programmable logic devices, testing the programmable logic devices, and so forth.

In such examples, one of the programmable logic devices is referred to as a "main" programmable logic device, and one or more other programmable logic devices are referred to as supplemental programmable logic devices. As an example, if there are three programmable logic devices associated with the BMC, the three programmable logic devices include a main programmable logic device, a secondary programmable logic device, and a tertiary programmable logic device. In further examples, a different quantity of programmable logic devices can be associated with the BMC.

The validation of machine-readable instructions of the programmable logic devices is performed based on connecting the supplemental programmable logic devices via scan chains to the main programmable logic device. By using the scan chains of the programmable logic devices to retrieve machine-readable instructions from selected programmable logic devices and passing the retrieved machine-readable instructions through the main programmable logic device, the BMC can use a common interface to retrieve the machine-readable instructions of different programmable logic devices for validation, and the BMC would not have to be configured with new interfaces to obtain machine-readable instructions of multiple programmable logic devices for validation.

Figure 1:
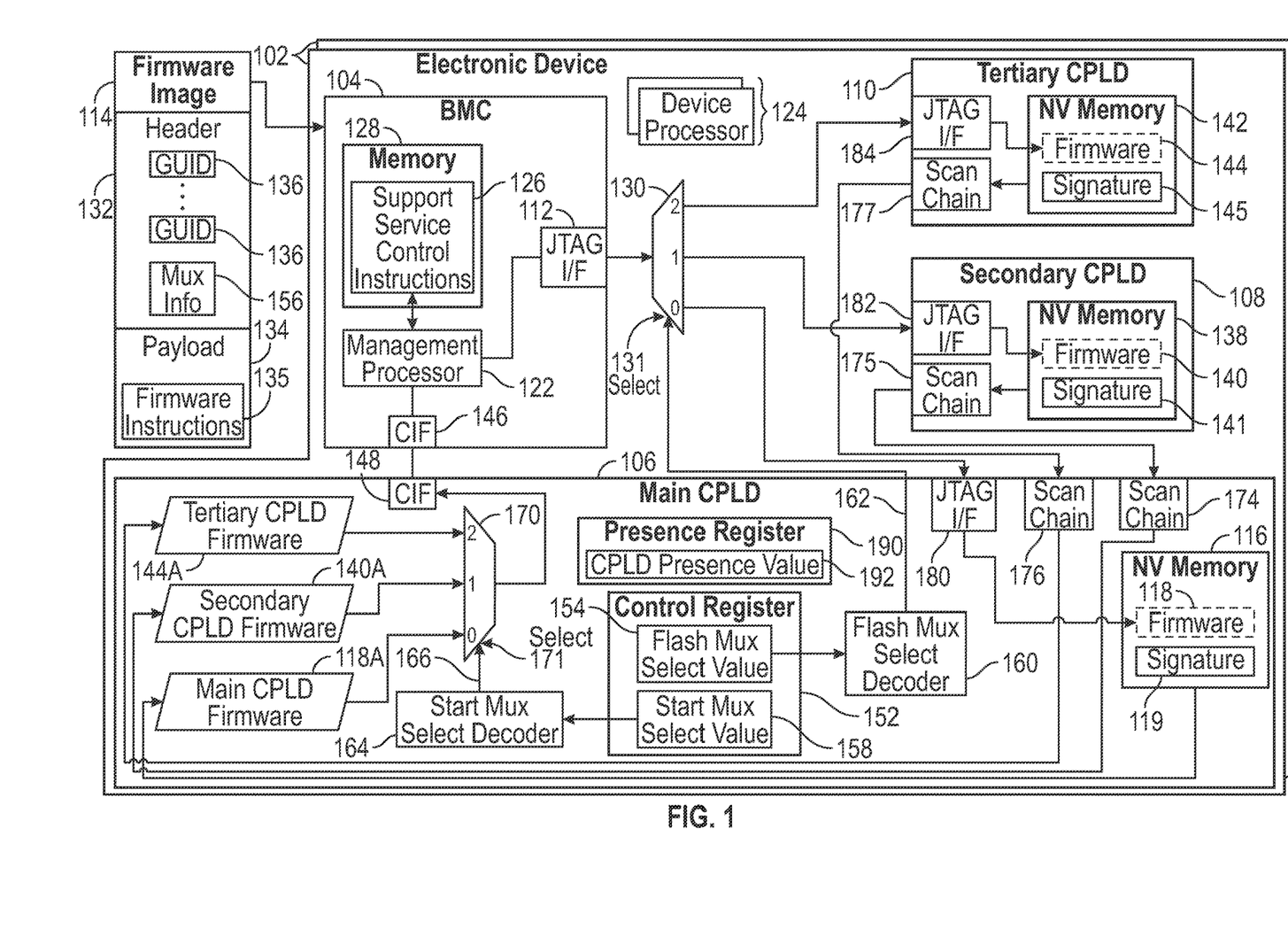
FIG. 1 is a block diagram of an arrangement of an electronic device that includes a baseboard management controller (BMC) and multiple programmable logic devices, according to some examples.

FIG. 1 is a block diagram of an example arrangement that includes electronic devices 102. Although multiple electronic devices are depicted in FIG. 1, in further examples, there can just be one electronic device. FIG. 1 shows the components of one of the electronic devices 102. The other electronic device(s) 102 can include similar components. Although a specific arrangement of components is depicted in FIG. 1, in other examples, other arrangements of components can be employed in the electronic devices 102.

The electronic device 102 includes a BMC 104 and three programmable logic devices, including a main complex programmable logic device (CPLD) 106, a secondary CPLD 108, and a tertiary CPLD 110. Although three CPLDs are depicted in the example of FIG. 1, in other examples, the BMC 104 can interact with a different quantity of CPLDs, such as two CPLDs or more than three CPLDs.

A CPLD includes logic gates that are programmable to perform various functions. As examples, a CPLD can include thousands to tens of thousands of logic gates. A CPLD can be programmed with machine-readable instructions (e.g., firmware) to perform the functions of the CPLD. Examples of the functions that can be programmed into a CPLD include a power sequencing function, a reset function, and/or other functions. Power sequencing refers to sequentially powering on components of the electronic device 102. The reset function is used to reset component(s) in the electronic device 102.

The BMC 104 can use the CPLD to perform any of the functions of the CPLD, such that the BMC 104 itself does not have to perform such functions. Effectively, such functions are offloaded to the CPLD and leveraged by the BMC 104 to perform management tasks associated with the BMC 104.

Although reference is made to CPLDs in some examples, it is noted that other types of programmable logic devices can be employed, such as programmable gate arrays (e.g., field programmable gate arrays or FPGAs), programmable integrated circuit devices (e.g., application specific integrated circuit (ASIC) devices), and so forth.

In some examples, the BMC 104 can perform support services with respect to the CPLDs 106, 108, and 110 through a support interface. For example, the BMC 104 can control the loading (flashing) of machine-readable instructions (e.g., firmware) into a CPLD. The loading can be part of an initial loading of the machine-readable instructions into a CPLD, or as part of an update operation in which of new machine-readable instructions (e.g., firmware) of the CPLD replace previously loaded machine-readable instructions on the CPLD. As another example, the BMC 104 can manage the validation of machine-readable instructions (e.g., firmware) previously loaded into a CPLD.

To load (flash) machine-readable instructions (e.g., firmware) into a CPLD, the support interface used can be a JTAG interface 112 of the BMC 104. A JTAG interface is a serial communications interface that is used as a dedicated debug port.

To retrieve machine-readable instructions (e.g., firmware) from a CPLD to validate the machine-readable instructions, the BMC 104 can use a CPLD interface (CIF) 146 of the BMC 104 and scan chains 174 and 176 of the main CPLD 106 (discussed further below).

Although reference is made to a JTAG interface, a CIF, and scan chains to perform support services with respect to CPLDs, in other examples, other types of support interfaces can be employed, where such other types of support interfaces can operate according to any of standardized, open-source, or proprietary protocols.

FIG. 1 shows an example of how the BMC can selectively load a firmware of a firmware image 114 into a selected one of the CPLDs 106, 108, and 110. The BMC 104 receives the firmware image 114 from a source, such as from a build tool used to generate firmware images for CPLDs. Although reference is made to firmware for execution by CPLDs in some examples, it is noted that in other examples, other types of machine-readable instructions can be executed by the CPLDs.

The firmware image 114 includes a header 132 and a payload 134. The content of the header 132 is discussed further below. The payload 134 contains firmware instructions 135 that are to be loaded into a selected CPLD. The loading of the firmware instructions 135 can include either an initial loading of the firmware instructions 135 into a selected CPLD (in cases where the CPLD has not yet previously been loaded with any firmware), or updating a firmware that was previously loaded in the selected CPLD.

The main CPLD 106 includes a nonvolatile memory 116, which is to store a firmware 118 of the main CPLD 106. The firmware 118 is executable by hardware processing circuitry of the main CPLD 106 to perform functions of the main CPLD 106. The firmware 118 is shown in dashed profile to indicate that the firmware 118 in some cases may not yet be stored in the nonvolatile memory 116, but is to be loaded from a firmware image, such as the firmware image 114.

As further depicted in FIG. 1, the secondary CPLD 108 includes a nonvolatile memory 138 to store firmware 140 of the secondary CPLD 108. The tertiary CPLD 110 includes a nonvolatile memory 142 to store firmware 144 of the tertiary CPLD 110.

The BMC 104 includes a management processor 122 that is part of the BMC 104. The BMC 104 is separate from a collection of device processors 124 of the electronic device 102. As used here, a "collection" of items can refer to a single item or multiple items. Thus, the collection of device processors 124 can include a single device processor or multiple device processors. The collection of device processors 124 make up the main processor(s) of the electronic device 102, and the collection of device processors 124 is to execute an OS, system firmware (e.g., Basic Input/Output System (BIOS) code), application programs, and so forth, of the electronic device 102.

The management processor 122 is to execute machine-readable instructions of the BMC 104 to perform tasks of the BMC 104. Such machine-readable instructions of the BMC 104 include support service control instructions 126, which are stored in a memory 128 of the BMC 104. The memory 128 can be implemented using a collection of memory devices, including any or some combination of a dynamic random access memory (DRAM) device, a static random access memory (SRAM) device, a flash memory device, and so forth.

The support service control instructions 126 are executable on the management processor 122 to perform support services for the CPLDs 106, 108, and 110 of the electronic device 102. As noted above, the support services can include loading (flashing) machine-readable instructions into a CPLD, or validating machine-readable instructions previously loaded in a CPLD.

Loading Firmware into a Selected CPLD

In accordance with some implementations of the present disclosure, the electronic device 102 includes a multiplexer 130 that can be used to selectively connect one of the CPLDs to the JTAG interface 112 of the BMC 104 for loading the firmware instructions 135 of the firmware image 114 into the connected CPLD. In examples according to FIG. 1, the multiplexer 130 is outside the main CPLD 106. Note that the JTAG interface 112 of the BMC 104 does not have sufficient I/O capacity to connect to multiple CPLDs. The multiplexer 130 can be controlled using its select input 131 to allow the JTAG interface 112 to connect to any of the CPLDs 106, 108, and 110. The multiplexer 130 can be implemented using a single multiplexer or an arrangement of multiple multiplexers.

As used here, a "multiplexer" can refer to circuitry that is used to selectively connect a first component with any of multiple other components. A "multiplexer" can perform either a multiplexing function or a demultiplexing function. A multiplexing function involves selectively connecting one of multiple inputs to a single output. A demultiplexing function involves selectively connecting a single input to one of multiple outputs.

For example, for loading firmware instructions into a selected CPLD, the JTAG interface 112 of the BMC 104 is an input to the multiplexer 130, and the outputs of the multiplexer 130 are connected to respective JTAG interfaces 180, 182, and 184 of the main CPLD 106, the secondary CPLD 108, and the tertiary CPLD 110, respectively. The multiplexer 130 performs a demultiplexing function to selectively connect the input (the JTAG interface 112) to any of multiple outputs (JTAG interfaces 180, 182, and 184) of corresponding CPLDs 106, 108, and 110. Thus, the firmware instructions 135 in the payload 134 of the firmware image 114 can be passed through the multiplexer 130 from the BMC's JTAG interface 112 to a selected one of the JTAG interfaces 180, 182, and 184. The select input 131 of the multiplexer 130 can be set to any of several different select values to select one of the outputs of the multiplexer 130 to connect to the input of the multiplexer 130.

The header 132 of the firmware image 114 contains various information pertaining to the firmware image 114, including a collection of target identifiers to identify target CPLD(s) into which the firmware image 114 is to be loaded. In some examples, the collection of target identifiers includes a collection of globally unique identifiers (GUIDs) 136 that each uniquely identifies a respective CPLD. In other examples, other types of identifiers of CPLDs can be included in the header 132 of the firmware image 114.

If a single GUID 136 is included in the firmware image header 132, then the firmware instructions 135 of the firmware image 114 are to be loaded into a single CPLD as identified by the GUID 136. If multiple GUIDs 136 are included in the firmware image header 132, then the firmware instructions 135 of the firmware image 114 are be loaded into multiple CPLDs in multiple electronic devices. More specifically, a first of the multiple GUIDs 136 identifies a CPLD in a first electronic device, a second of the multiple GUIDs 136 identifies a CPLD in a second electronic device, and so forth.

The support service control instructions 126 executable on the management processor 122 in the BMC 104 can use the GUID(s) 136 included in the firmware image header 132 to control, through the main CPLD 106, the multiplexer 130 to connect the BMC's JTAG interface 112 to one of the CPLDs 106, 108, and 110. The BMC 104 is to interact with the CPLD 106 through a CPLD interface (CIF) 146 of the BMC 104. The CIF 146 is separate from the JTAG interface 112 and is used by the BMC 104 is to issue commands to the main CPLD 106 to perform functions of the main CPLD 106, and to receive information from the main CPLD 106.

The BMC's CIF 146 communicates with a CIF 148 of the main CPLD 106. To control the multiplexer 130, the support service control instructions 126 executing in the BMC 104 sends a command to write a flash multiplexer select value 154 to a control register 152 in the main CPLD 106. A "register" can refer to any storage element that is capable of storing information. A register can be implemented using an arrangement of storage latches, as part of a memory device, and so forth.

In some examples, multiplexer information 156 can be included in the firmware image header 132 received by the BMC 104. The support service control instructions 126 can retrieve the multiplexer information 156 from the firmware image header 132, to obtain the following values: the flash multiplexer select value 154 that is written to the control register 152, and an address at which the flash multiplexer select value 154 is to be written. In some examples, the address included in the multiplexer information 156 is part of an I/O address space that identifies a storage location in the main CPLD 106 (in this case a location in the control register 152) at which the flash multiplexer select value 154 is to be written.

In some examples, the flash multiplexer select decoder 160 can decode the flash multiplexer select value 154 to produce a multiplexer select indication 162 that is provided to the select input 131 of the multiplexer 130. In some examples, the multiplexer select indication 162 includes signals that can be selectively set in an active state or inactive state. The combination of the signals selects one of the three outputs of the multiplexer 130 connected to the JTAG interfaces 180, 182, and 184 of the CPLDs 106, 108, and 110, respectively. The signals of the multiplexer select indication 162 can be provided from I/O pins of the main CPLD 106 to the select input 131 of the multiplexer 130. For example, the multiplexer select indication 162 can include two select signals, which can be selectively set at 0 or 1. If the select signals have state 00, then output 0 of the multiplexer 130 is selected to connect the BMC's JTAG interface 112 to the main CPLD's JTAG interface 180; if the select signals have state 01, then output 1 of the multiplexer 130 is selected to connect the BMC's JTAG interface 112 to the secondary CPLD's JTAG interface 182; and if the select signals have state 10, then output 2 of the multiplexer 130 is selected to connect the BMC's JTAG interface 112 to the tertiary CPLD's JTAG interface 184.

Validating Firmware in a CPLD

In accordance with some implementations of the present disclosure, the support service control instructions 126 executing in the BMC 104 can retrieve firmware from a selected CPLD (from among the CPLDs 106, 108, and 110) to validate the retrieved firmware. The validation of CPLD firmware can be performed during a secure start procedure of the BMC 104 (e.g., during a boot of the BMC 104) or at another time. "Secure start" refers to ensuring that the BMC 104 can be started in a state that has not been compromised. A "boot" of the BMC 104 refers to a process by which the BMC 104 is initialized for operation following a power cycle of the BMC 104 or a reset of the BMC 104.

The support service control instructions 126 can send a command to retrieve CPLD firmware through the BMC's CIF 146. The command to retrieve CPLD firmware is sent to the main CPLD 106, which receives the command through its CIF 148. In association with the command to retrieve CPLD firmware, the support service control instructions 126 can send a start multiplexer select value 158 to the main CPLD 106 to select the CPLD whose firmware is to be retrieved. For example, the support service control instructions 126 can write the start multiplexer select value 158 can be written to the control register 152 or another control register. The start multiplexer select value 158 is written to a specified I/O address, which results in the start multiplexer select value 158 being written to the control register 152 or another control register.

The start multiplexer select value 158 can be provided to a start multiplexer selector decoder 164. In some examples, the start multiplexer selector decoder 164 can decode the start multiplexer select value 158 to produce a multiplexer select indication 166 that is provided to a select input 171 of the multiplexer 170. The multiplexer 170 is included in the main CPLD 106 in some examples. In other examples, the multiplexer 170 can be external of the main CPLD 106.

In some examples, the multiplexer select indication 166 includes signals that can be selectively set in an active state or inactive state. The combination of the signals selects one of the three inputs of the multiplexer 170 that respectively receive a main CPLD firmware 118A (from the main CPLD's nonvolatile memory 116), a secondary CPLD firmware 140A (from the secondary CPLD's nonvolatile memory 138), and a tertiary CPLD firmware 144A (from the tertiary CPLD's nonvolatile memory 142).

For example, the multiplexer select indication 166 can include two select signals, which can be selectively set at 0 or 1. If the select signals have state 00, then input 0 of the multiplexer 170 is selected to connect to the CIF 148 of the main CPLD 106 to provide the main CPLD firmware 118A to the BMC 104; if the select signals have state 01, then input 1 of the multiplexer 170 is selected to connect to the CIF 148 of the main CPLD 106 to provide the secondary CPLD firmware 140A to the BMC 104; and if the select signals have state 10, then input 2 of the multiplexer 170 is selected to connect to the CIF 148 of the main CPLD 106 to provide the tertiary CPLD firmware 144A to the BMC 104.

The command to retrieve CPLD firmware issued by the support service control instructions 126 executing in the BMC 104 can cause retrieval of a CPLD firmware from a selected CPLD (as selected by the start multiplexer select value 158) as well as a stored signature associated with the CPLD firmware. For example, a signature 119 is stored in the main CPLD's nonvolatile memory 116 in association with the main CPLD's firmware 118, a signature 141 is stored in the secondary CPLD's nonvolatile memory 138 in association with the secondary CPLD's firmware 140, and a signature 145 is stored in the tertiary CPLD's nonvolatile memory 142 in association with the tertiary CPLD's firmware 144.

Each signature 119, 141, or 145 is generated when loading the respective CPLD firmware 118, 140, or 144 into the corresponding nonvolatile memory 116, 138, or 142. For example, the support service control instructions 126 can sign the firmware instructions 135 (or a portion thereof) to be loaded into a selected CPLD. The signing of the firmware instructions 135 (or a portion thereof) can be based on use of a private key of the BMC 104, for example.

When the support service control instructions 126 receive the CPLD firmware (one of 118A, 140A, and 144A) and the associated stored signature (one of 119, 141, and 145) from the main CPLD 106, the support service control instructions 126 derives a signature based on the received CPLD firmware and compares the derived signature to the received stored signature. If the derived signature matches the received stored signature, then the support service control instructions 126 can make a determination that the received CPLD firmware is valid (i.e., has not been corrupted or is otherwise in proper form). On the other hand, if the derived signature does not match the received stored signature, then the support service control instructions 126 can make a determination that the received CPLD firmware is invalid. In the latter case, the support service control instructions 126 can issue an error indication in the BMC 104 to prevent use of the CPLD with the invalid CPLD firmware.

The CPLDs 106, 108, and 110 include scan chains to perform communications with one another. The main CPLD 106 includes a scan chain 174 to communicate with a scan chain 175 of the secondary CPLD 108, and the main CPLD 106 includes a scan chain 176 to communicate with a scan chain 177 of the secondary CPLD 110. A scan chain is an interface that serializes data into a sequence of bits that can be shifted out. Thus, for example, the firmware 140 and signature 141 can be read from the secondary CPLD's nonvolatile memory 138 and shifted out through the scan chain 175 of the secondary CPLD 108 and shifted into the scan chain 174 of the main CPLD 106. Similarly, the firmware 144 and signature 145 can be read from the tertiary CPLD's nonvolatile memory 142 and shifted out through the scan chain 177 of the tertiary CPLD 108 and shifted into the scan chain 176 of the main CPLD 106.

Although not shown in FIG. 1, circuitry can be provided between the nonvolatile memory 138 or 142 of the respective CPLD 108 or 110 to serialize the retrieved data (including the firmware 140 or 144 and the signature 141 or 145) to a serial form that can be shifted through the corresponding scan chain 175 or 177. Similarly, circuitry (not shown) can be provided between the scan chain 174 or 176 of the main CPLD 106 and the multiplexer 170 to convert the serial stream of data (including the firmware 140 or 144 and the signature 141 or 145) into parallel form to provide to the multiplexer 170 for output through the CIF 148 of the main CPLD 106.

In other examples, other types of interfaces can be employed for communications between CPLDs. The data (firmware and signature of a selected CPLD) received at the scan chain 174 or 176 can be provided to the multiplexer 170 for output through the main CPLD's CIF 148 to the BMC 104.

By using the scan chains of the CPLDs to retrieve firmware from selected CPLDs and passing the retrieved firmware through the main CPLD 106, the BMC 104 can use a common interface (e.g., the CIF 146) to retrieve the firmware of different CPLDs for validation, and the BMC 104 would not have to be configured with new interfaces to obtain firmware of multiple CPLDs for validation of the firmware, which can reduce the complexity and cost of the BMC 104. Also, by being able to obtain the firmware of the supplemental CPLDs (the secondary CPLD 108 and the tertiary CPLD 110) through the main CPLD 106, the BMC 104 would not have to be configured with certain details of the supplemental CPLDs, such as the sizes and types of firmware stored in the supplemental CPLDs.

Presence Register to Indicate CPLD Presence

Figure 2:
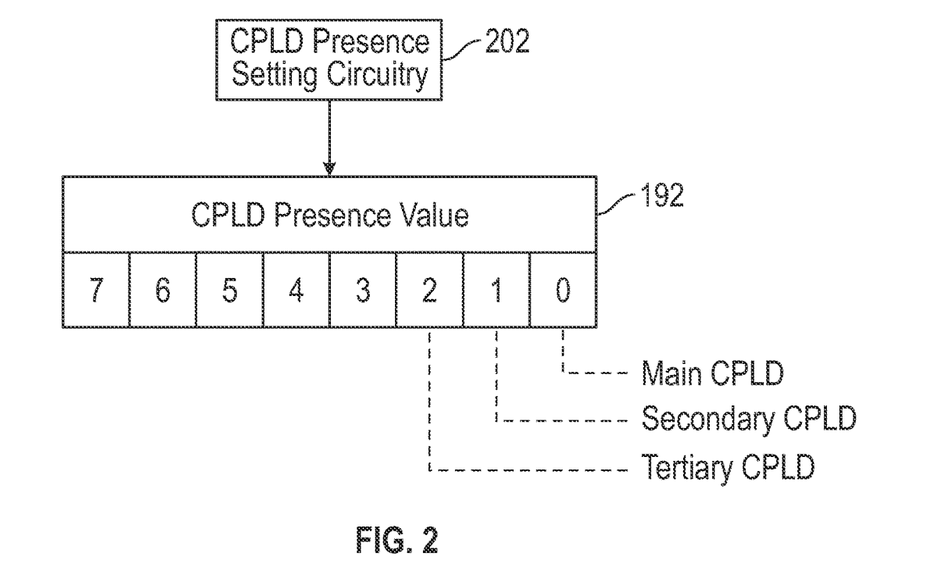
FIG. 2 is a block diagram of a complex programmable logic device (CPLD) presence value and CPLD presence setting circuitry to set the CPLD presence value, according to some examples.

The main CPLD 106 also includes a presence register 190 to store a CPLD presence value 192 to indicate which CPLDs are present in the electronic device 102. FIG. 2 shows an example of the CPLD presence value 192. The CPLD presence value 192 includes multiple bits (8 bits shown in the example of FIG. 2). Bit 0 of the CPLD presence value 192 indicates the presence of the main CPLD 106. In some examples, bit 0 corresponding to the main CPLD 106 would be set to a first value (e.g., 1) to indicate that the main CPLD 106 is present. If it is assumed that the main CPLD 106 would be included in the electronic device, bit 0 of the CPLD presence value 192 would not be set to a second value (e.g., 0) since the main CPLD 106 is assumed to be present in the electronic device 102 in some examples.

The other bits (bit 1 to bit 7) of the CPLD presence value 192 can be set to the first value (e.g., 1) if the corresponding CPLD is present, and set to the second value (e.g., 0) if the corresponding CPLD is not present. In the example of FIG. 2, it is assumed that bit 1 of the CPLD presence value 192 corresponds to the secondary CPLD 108, and bit 2 of the CPLD presence value 192 corresponds to the tertiary CPLD 110. In other examples, other bits of the CPLD presence value 192 can correspond to the main CPLD 106, the secondary CPLD 108, and the tertiary CPLD 110.

In further examples, the CPLD presence value 192 can include less than or more than 8 bits. Also, although FIG. 1 shows one presence register 190 that contains the CPLD presence value 192, in other examples, multiple presence registers can be used to indicate presence of CPLDs.

In some examples, the main CPLD 106 includes CPLD presence setting circuitry 202 that populates the CPLD presence value 192 in the presence register 190. For example, the CPLD presence setting circuitry 202 can scan interfaces of the main CPLD 106 to detect what other CPLD(s) is (are) connected to the main CPLD 106, and can populate respective bits (other than bit 0) of the CPLD presence value 192 based on which CPLD(s) is (are) present. If no other CPLD is present, then the CPLD presence value 192 would include bit 0 set to the first value (e.g., 1), and the remaining bits set to the second value (e.g., 0).

In other examples, in arrangements where the CPLD(s) that is (are) present in the electronic device 102 is statically determined at the time of manufacture or assembly of the electronic device 102, the CPLD presence setting circuitry 202 can include a hard strap circuitry to statically set the bits of the CPLD presence value 192 to respective values depending on which CPLD(s) is (are) present in the electronic device 102 at the time of manufacture or assembly.

GUIDs for Multiplexed CPLDS

Figure 3:
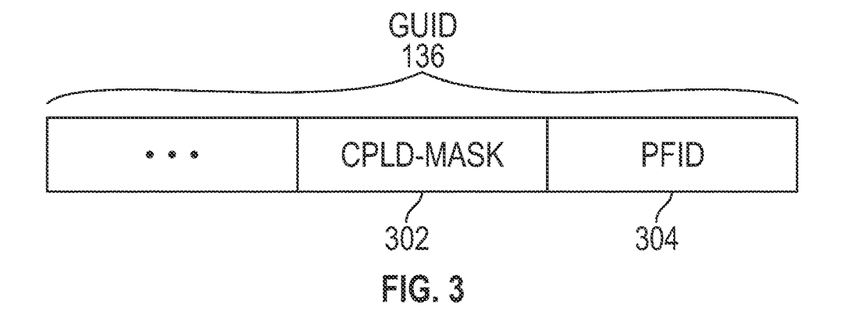
FIG. 3 is a block diagram of a globally unique identifier (GUID) according to some examples.

As noted above, different CPLDs present in the electronic device 102 are identified using different GUIDs. FIG. 3 shows an example GUID 136. The GUID 136 includes multiple portions, including a CPLD-MASK 302 and a platform identifier (PFID) 304. The GUID 136 can include other portions not shown in FIG. 3.

The PFID 304 is an identifier of a platform (e.g., the electronic device 102) in which the CPLD identified by the GUID 136 is present. Different PFID values identify different platforms (e.g., different electronic devices 102).

The CPLD-MASK 302 indicates which CPLD to program with the firmware instructions 135 of the firmware image 114 (FIG. 1). For example, a first value of the CPLD-MASK 302 indicates that the main CPLD 106 is to be programmed, a second value of the CPLD-MASK 302 indicates that the secondary CPLD 108 is to be programmed, a third value of the CPLD-MASK 302 indicates that the tertiary CPLD 110 is to be programmed, and so forth.

Figure 4:
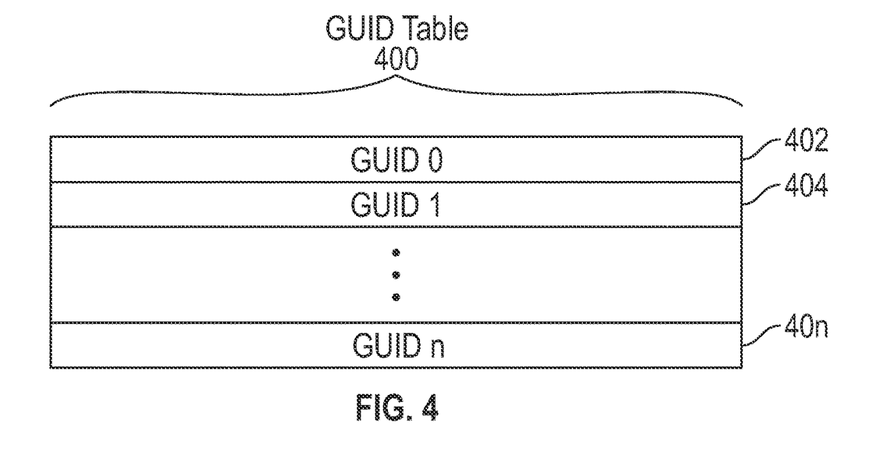
FIG. 4 illustrates a GUID table according to some examples.

FIG. 4 shows a GUID table 400 that can be maintained by the BMC 104. In some examples, the GUID table 400 is stored in the memory 128 of the BMC 104 (FIG. 1). The GUID table 400 includes GUIDs 402, 404, . . . , 40$n$ ($n \geq 1$) of the CPLDs that are present in the electronic device identified by a PFID. Each of the GUIDs 402, 404, . . . , 40$n$ has a format according to that shown in FIG. 3.

To populate the GUID table 400 (such as during a boot of the BMC 104), the support service control instructions 126 executing in the BMC 104 issues a presence read command to the main CPLD 106 (through the CIF 146) to retrieve the CPLD presence value 192 from the presence register 190 in the main CPLD 106. The support service control instructions 126 determine which bits of the CPLD presence value 192 have the first value (e.g., 1), and adds a corresponding GUID to a respective entry of the GUID table 400 in response to detecting that the respective bit of the CPLD presence value 192 has the first value. The support service control instructions 126 do not add GUIDs of CPLDs not present in the electronic device 102 to the GUID table 400.

When the support service control instructions 126 receive the firmware image 114, the support service control instructions 126 can extract a GUID 136 from the firmware image header 132 (FIG. 1) and determine whether the extracted GUID 136 matches a GUID in the GUID table 400. If the support service control instructions 126 determine that the extracted GUID 136 does not match any GUID in the GUID table 400, then the support service control instructions 126 do not proceed with the firmware programming operation. However, if the support service control instructions 126 determine that the extracted GUID 136 matches a GUID in the GUID table 400, then the support service control instructions 126 can obtain, from the multiplexer information 156 in the firmware image header 132, the flash multiplexer select value 154 that is written to the control register 152, and an address at which the flash multiplexer select value 154 is to be written, and proceed with the firmware programming operation to load the firmware instructions 135 in the firmware image payload 134 into the CPLD identified by the extracted GUID 136.

Validating CPLD Firmware

Figure 5:
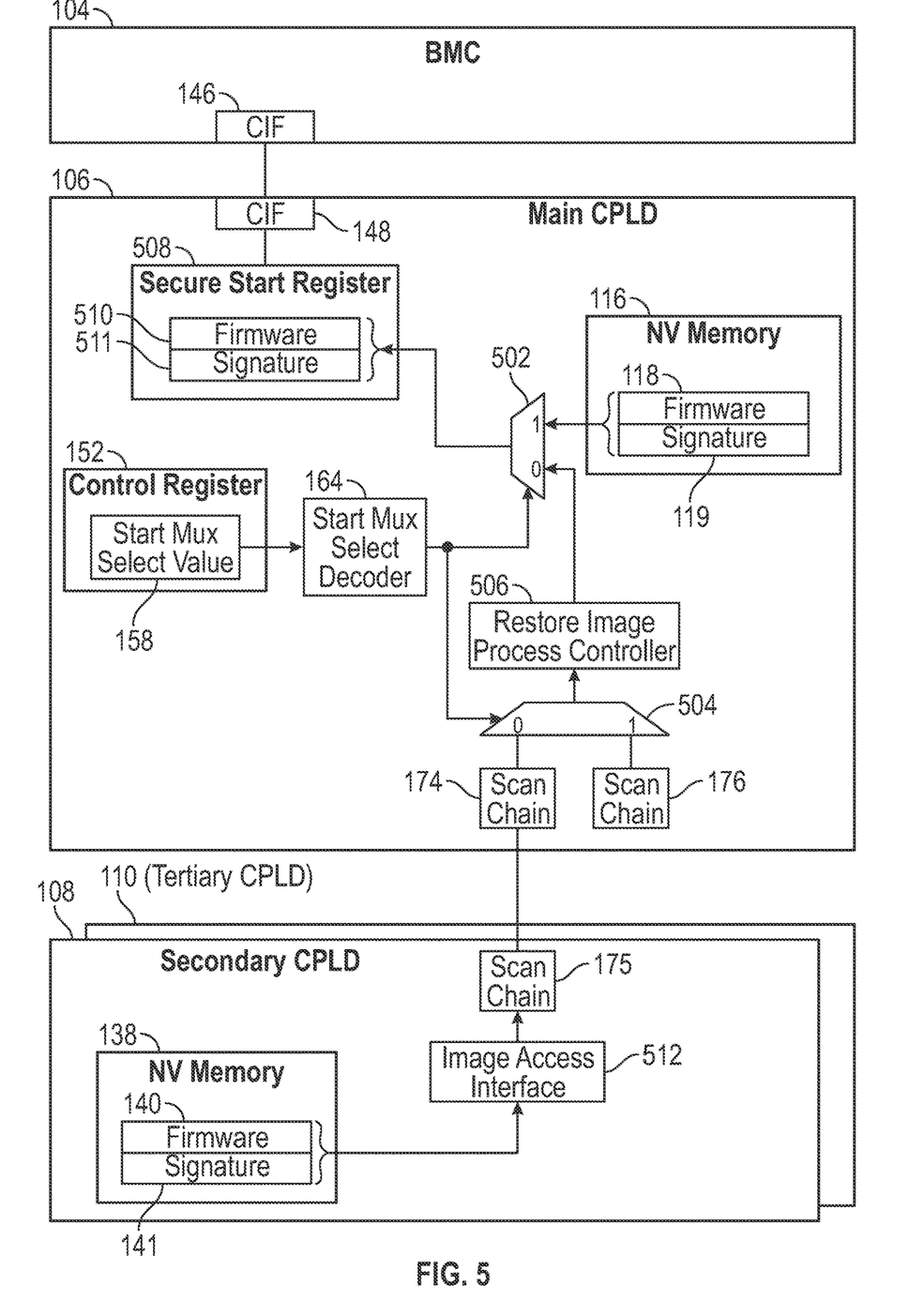
FIG. 5 is a block diagram of an arrangement that includes a BMC and multiple programmable logic devices, according to further examples.

FIG. 5 shows an example arrangement to allow the BMC 104 to retrieve a firmware from a selected CPLD for validation by the BMC 104. Components depicted in FIG. 5 with the same reference numerals as those in FIG. 1 are similar to such components.

The BMC 104 (and more specifically, the support service control instructions 126 in FIG. 1) sets the start multiplexer select value 158 in the control register 152 in the main CPLD 106. The start multiplexer select value 158 controls which of the CPLDs 106, 108, and 110 is selected for retrieval of the CPLD firmware. The BMC 104 can use the GUID table 400 (FIG. 4) to determine which CPLDs are present in the electronic device 102, and can set respective start multiplexer select values in the control register 152 to successively select different CPLDs from which CPLD firmware is to be retrieved for validation.

The start multiplexer select decoder 164 decodes the start multiplexer select value 158 and provides select indications to a multiplexer 502 and a multiplexer 504 to select which inputs of the multiplexers 502 and 504 are to be connected to corresponding outputs of the multiplexers 502 and 504. Collectively, the multiplexers 502 and 504 can form the multiplexer 170 shown in FIG. 1.

In some examples, input 0 of the multiplexer 502 is connected to the output of a remote image access controller 506, while input 1 of the multiplexer 502 is connected to the nonvolatile memory 116 of the main CPLD 106. The remote image access controller 506 serves as a proxy for the BMC 104 in obtaining a CPLD firmware from a supplemental CPLD (one of the secondary CPLD 108 and the tertiary CPLD 110, for example). The remote image access controller 506 responds to a command to retrieve CPLD firmware from the BMC 104 by issuing a corresponding command to the supplemental CPLD. The command to retrieve CPLD firmware from the BMC 104 can include an identifier (e.g., a GUID) of the CPLD from which the CPLD firmware is to be retrieved. The remote image access controller 506 can be implemented using a portion of the hardware processing circuitry of the main CPLD 106 or using machine-readable instructions executed by the main CPLD 106.

If the start multiplexer select value 158 written to the control register 152 selects the main CPLD 106, then the start multiplexer select decoder 164 controls the select input of the multiplexer 502 to steer the firmware 118 and associated signature 119 from the nonvolatile memory 116 of the main CPLD 106 to the output of the multiplexer 502. The firmware 118 and associated signature 119 are stored in a secure start register 508 of the main CPLD 106. The secure start register 508 stores a firmware 510 and associated signature 511, which are the firmware and associated signature of a selected CPLD (any of the main CPLD 106, the secondary CPLD 108, and the tertiary CPLD 110).

Although shown as separate registers, it is noted that in some examples, the secure start register 508 and the control register 152 can be integrated into one register.

If a firmware and associated signature are to be retrieved from a supplemental CPLD (108 or 110), then the start multiplexer select value 158 will cause the start multiplexer select decoder 164 to control the select input of the multiplexer 502 to allow the firmware and associated signature received by the remote image access controller 506 to be provided to the output of the multiplexer 502, for storing in the secure start register 508.

The input to the remote image access controller 506 is the output of the multiplexer 504. In examples where the firmware and associated signature are to be retrieved from a supplemental CPLD, the start multiplexer select decoder 164 controls the select input of the multiplexer 504 to determine whether the firmware and associated signature from the secondary CPLD 108 or the tertiary CPLD 110 are to be provided to the output of the multiplexer 504. The firmware and associated signature of the secondary CPLD 18 is received through the scan chain 174, and are provided to input 0 of the multiplexer 504. The firmware and associated signature of the tertiary CPLD 110 are received through the scan chain 176 of the main CPLD 106, and are provided to input 1 of the multiplexer 504.

The firmware and associated signature of the selected supplemental CPLD (as selected by the start multiplexer select value 158) are received by the remote image access controller 506 from the output of the multiplexer 504. The firmware and associated signature of the selected supplemental CPLD from the remote image access controller 506 are steered by the multiplexer 502 to the secure start register 508.

The secondary CPLD 108 includes an image access interface 512, which responds to a command from the remote image access controller 506 of the main CPLD 106 by retrieving the firmware and associated signature from the nonvolatile memory 138 to provide as output through the scan chain 175 of the secondary CPLD 18. The image access interface 512 can be implemented with a portion of the hardware processing circuitry of the secondary CPLD 108, or as machine-readable instructions executable by the secondary CPLD 108. The tertiary CPLD 110 includes a similar image access interface.

The firmware 510 and associated signature 511 stored in the secure start register 508 can be read by the BMC 104 through the CIFs 146 and 148. The BMC 104 then validates the retrieved firmware 510 and associated signature 511.

Further Examples

Figure 6:
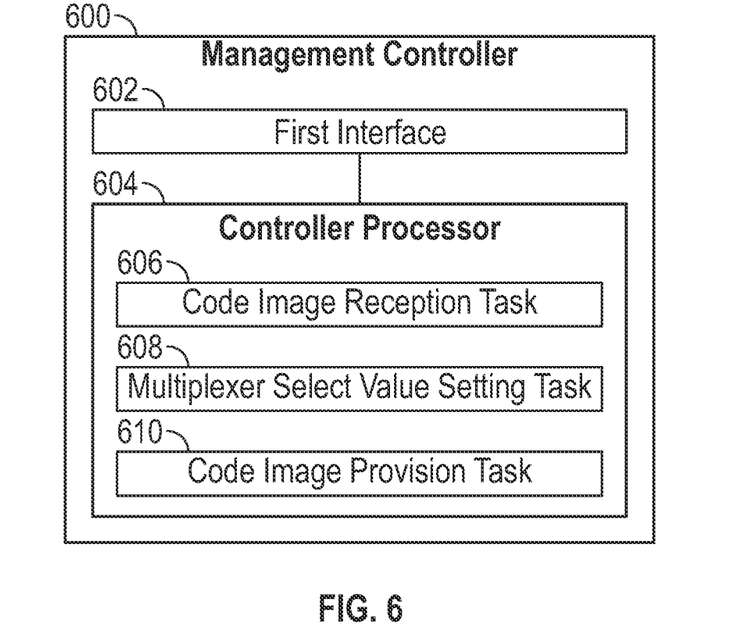
FIG. 6 is a block diagram of a management controller according to some examples.

FIG. 6 is a block diagram of a management controller 600 according to some examples. The management controller 600 can be the BMC 104 of FIG. 1, for example.

The management controller 600 includes a first interface 602 (e.g., the JTAG interface 112 of FIG. 1) through which the management controller 600 is to provide a support service for any of a plurality of programmable logic devices (e.g., CPLDs 106, 108, and 110) in an electronic device (e.g., 102 in FIG. 1).

The management controller 600 includes a controller processor 604 that is programmed (e.g., by machine-readable instructions) to perform various tasks. The tasks of the controller processor 604 include a code image reception task 606 to receive a code image to perform a programmable logic device update, where the code image includes an identifier (e.g., a GUID) of a programmable logic device. The code image can be the firmware image 114 of FIG. 1, or a different code image containing another type of machine-readable instructions.

The tasks of the controller processor 604 include a multiplexer select value setting task 608 to, in response to determining that the identifier corresponds to a given programmable logic device that is present in the electronic device, set a multiplexer select value to control a multiplexer to connect the first interface 602 of the management controller 600 to the given programmable logic device. Different multiplexer select values are to control the multiplexer to connect the first interface 602 of the management controller 600 to different programmable logic devices of the plurality of programmable logic devices. The multiplexer can be the multiplexer 130 in FIG. 1, for example.

The tasks of the controller processor 604 include a code image provision task 608 to provide the code image to the given programmable logic device through the first interface and the multiplexer to update the given programmable logic device. The code image can be loaded into a nonvolatile memory of the given programmable logic device.

In some examples, the controller processor 604 determines that the identifier corresponds to the given programmable logic device that is present in the electronic device based on determining that the identifier matches a device identifier in stored information (e.g., the GUID table 400 of FIG. 4) containing a collection of device identifiers of programmable logic devices that are present in the electronic device.

In some examples, the controller processor 604 populates the stored information using presence information (e.g., the CPLD presence value 192 in FIG. 1) indicating the programmable logic devices that are present in the electronic device.

In some examples, each device identifier of the collection of device identifiers includes a first identifier portion (e.g., the PFID 304 of FIG. 3) that identifies the electronic device and a second identifier portion (e.g., the CPLD-MASK 302 of FIG. 1) that represents a respective programmable logic device that is present in the electronic device.

In some examples, the first identifier portions of the device identifiers of the collection device identifiers share an identifier of the electronic device, and the second identifier portions of the device identifiers of the collection device identifiers contain different values to indicate different programmable logic devices of the plurality of programmable logic devices.

In some examples, the controller processor 604 validates a first code image in a first programmable logic device of the plurality of programmable logic devices by setting a first multiplexer select value to control a second multiplexer (e.g., 170 in FIG. 1) to steer the first code image from the first programmable logic device to the management controller 600, and reading the first code image from the first programmable logic device.

Figure 7:
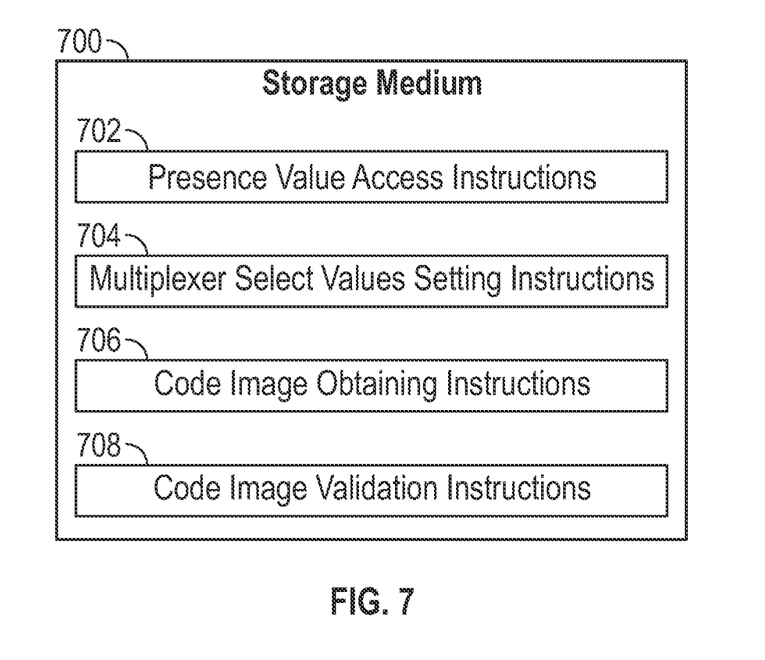
FIG. 7 is a block diagram of a storage medium storing machine-readable instructions according to some examples.

FIG. 7 is a block diagram of a non-transitory machine-readable or computer-readable storage medium 700 storing machine-readable instructions that upon execution cause a management controller to perform various tasks. The management controller can be the BMC 104 of FIG. 1, for example.

The machine-readable instructions include presence value access instructions 702 to access a presence value stored in a register to determine a plurality of programmable logic devices associated with the management controller that are present in an electronic device. The presence value can be the CPLD presence value 192 in the presence register 190 of FIG. 1.

The machine-readable instructions include multiplexer select values setting instructions 704 to set different multiplexer select values to control a multiplexer in a first programmable logic device to select different programmable logic devices of the plurality of programmable logic devices determined to be present. The first programmable logic device can be the main CPLD 106 of FIG. 1, for example, and the multiplexer can be the multiplexer 170 of FIG. 1.

The machine-readable instructions include code image obtaining instructions 706 to obtain, based on setting a respective multiplexer select value of the different multiplexer select values, a code image from a respective programmable logic device of the plurality of programmable logic devices. The machine-readable instructions include code image validation instructions 708 to validate the obtained code image received by the management controller through the multiplexer controlled according to the respective multiplexer select value.

Figure 8:
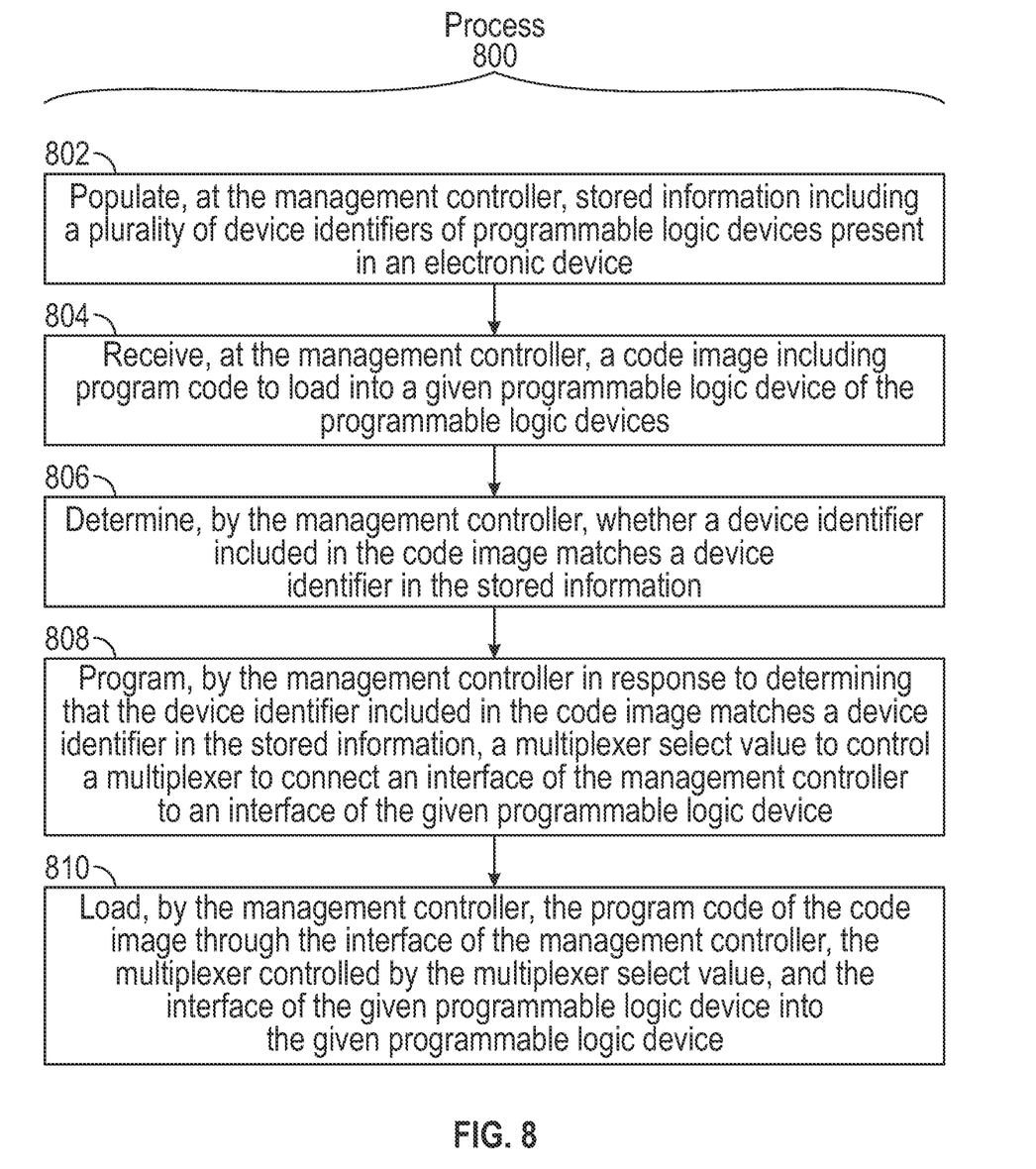
FIG. 8 is a flow diagram of a process according to some examples.

FIG. 8 is a flow diagram of a process 800 according to some examples. The process 800 can be performed by a management controller.

The process 800 includes populating (at 802), at the management controller, stored information including a plurality of device identifiers of programmable logic devices present in an electronic device. The stored information can be in the form of the GUID table 400 of FIG. 4, for example, and the device identifiers can include GUIDs of CPLDs.

The process 800 includes receiving (at 804), at the management controller, a code image including program code to load into a given programmable logic device of the programmable logic devices. The program code can include firmware or another type of machine-readable instructions.

The process 800 includes determining (at 806), by the management controller, whether a device identifier included in the code image matches a device identifier in the stored information. The device identifier included in the code image can be a GUID 136 included in the header 132 of the firmware image 114, for example.

The process 800 includes programming (at 808), by the management controller in response to determining that the device identifier included in the code image matches a device identifier in the stored information, a multiplexer select value to control a multiplexer to connect an interface of the management controller to an interface of the given programmable logic device. The multiplexer can be the multiplexer 130 of FIG. 1, and the interface of the management controller can be the JTAG interface 112 of FIG. 1, for example.

The process 800 includes loading (at 810), by the management controller, the program code of the code image through the interface of the management controller, the multiplexer controlled by the multiplexer select value, and the interface of the given programmable logic device into the given programmable logic device.

A storage medium (e.g., 700 in FIG. 7) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

A "BMC" can refer to a specialized service controller that monitors the physical state of an electronic system using sensors and communicates with a remote management system (that is remote from the electronic system) through an independent "out-of-band" connection. The BMC can perform management tasks to manage components of the electronic system. Examples of management tasks that can be performed by the BMC can include any or some combination of the following: power control to perform power management of the electronic system (such as to transition the electronic system between different power consumption states in response to detected events), thermal monitoring and control of the electronic system (such as to monitor temperatures of the electronic system and to control thermal management states of the electronic system), fan control of fans in the electronic system, system health monitoring based on monitoring measurement data from various sensors of the electronic system, remote access of the electronic system (to access the electronic system over a network, for example), remote reboot of the electronic system (to trigger the electronic system to reboot using a remote command), system setup and deployment of the electronic system, system security to implement security procedures in the electronic system, and so forth.

In some examples, the BMC can provide so-called "lights-out" functionality for an electronic system. The lights out functionality may allow a user, such as a systems administrator, to perform management operations on the electronic system even if an operating system (OS) is not installed or not functional on the electronic system.

Moreover, in some examples, the BMC can run on auxiliary power provided by an auxiliary power supply (e.g., a battery); as a result, the electronic system does not have to be powered on to allow the BMC to perform the BMC's operations. The auxiliary power supply is separate from a main power supply that supplies powers to other components (e.g., a main processor, a memory, an input/output (I/O) device, etc.) of the electronic system.

In some examples, in addition to the BMC in each electronic system, an additional management controller (separate from the BMCs) can be used to interact with the BMCs to perform management of the electronic systems. In examples where the electronic systems are server computers (or other types of electronic systems) mounted in a rack, the additional management controller can be referred to as a rack management controller (RMC). A "rack" refers to a mounting structure that has supports for multiple electronic systems.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A management controller comprising:
   a first interface through which the management controller is to provide a support service for any of a plurality of programmable logic devices in an electronic device; and
   a controller processor to:
   receive a code image to perform a programmable logic device update, wherein the code image comprises multiplexer information and an identifier of a programmable logic device;
   in response to determining that the identifier corresponds to a given programmable logic device that is present in the electronic device, set a multiplexer select value based on the multiplexer information in the code image, the multiplexer select value to control a multiplexer to connect the first interface of the management controller to the given programmable logic device, wherein different multiplexer select values are to control the multiplexer to connect the first interface of the management controller to different programmable logic devices of the plurality of programmable logic devices; and
   provide the code image to the given programmable logic device through the first interface and the multiplexer controlled according to the multiplexer select value to update the given programmable logic device.

2. The management controller of claim 1, wherein the controller processor is to determine that the identifier corresponds to the given programmable logic device that is present in the electronic device based on determining that the identifier matches a device identifier in stored information containing a collection of device identifiers of programmable logic devices that are present in the electronic device.

3. The management controller of claim 2, wherein the controller processor is to populate the stored information using presence information indicating the programmable logic devices that are present in the electronic device.

4. The management controller of claim 3, wherein the presence information is stored in a first register in a first programmable logic device of the plurality of programmable logic devices, and wherein the first programmable logic device is different from the given programmable logic device.

5. The management controller of claim 4, wherein the controller processor is to set the multiplexer select value in a second register in the first programmable logic device to control the multiplexer.

6. The management controller of claim 2, wherein the controller processor is to populate the stored information containing the collection of device identifiers of programmable logic devices that are present in the electronic device during a boot of the management controller.

7. The management controller of claim 2, wherein each device identifier of the collection of device identifiers comprises a first identifier portion that identifies the electronic device and a second identifier portion that represents a respective programmable logic device that is present in the electronic device.

8. The management controller of claim 7, wherein the first identifier portions of the device identifiers of the collection of device identifiers share an identifier of the electronic device, and the second identifier portions of the device identifiers of the collection of device identifiers contain different values to indicate different programmable logic devices of the plurality of programmable logic devices.

9. The management controller of claim 1, wherein the multiplexer information in the code image comprises the multiplexer select value, and the controller processor is to extract the multiplexer select value from a header of the code image.

10. The management controller of claim 1, wherein the controller processor is to validate a first code image in a first programmable logic device of the plurality of programmable logic devices by:

setting a first multiplexer select value to control a second multiplexer to steer the first code image from the first programmable logic device to the management controller, and reading the first code image from the first programmable logic device.

11. The management controller of claim 10, wherein the controller processor is to derive a signature of the first code image read from the first programmable logic device, and validate the first code image based on the derived signature.

12. The management controller of claim 1, wherein the first interface of the management controller comprises a Joint Test Action Group (JTAG) interface.

13. The management controller of claim 10, wherein the second multiplexer is part of a second programmable logic device that is different from the first programmable logic device, and wherein the first code image from the first programmable logic device is read through the second programmable logic device.

14. The management controller of claim 13, wherein the controller processor is to validate a second code image in a third programmable logic device of the plurality of programmable logic devices by:

setting a second multiplexer select value to control the second multiplexer in the second programmable logic device to steer the second code image from the third programmable logic device to the management controller, and reading the second code image from the third programmable logic device through the second programmable logic device.

15. The management controller of claim 13, wherein the second programmable logic device comprises a scan chain to receive the first code image from a scan chain of the first programmable logic device.

16. The management controller of claim 10, further comprising a second interface different from the first interface, the first interface comprising a Joint Test Action Group (JTAG) interface, wherein the controller processor is to read the first code image from the first programmable logic device through the second interface of the management controller.

17. A non-transitory machine-readable storage medium comprising instructions that upon execution cause a management controller to:

access a presence value stored in a register to determine a plurality of programmable logic devices associated with the management controller that are present in an electronic device;

set different multiplexer select values to control a multiplexer in a first programmable logic device to select different programmable logic devices of the plurality of programmable logic devices determined to be present, wherein the first programmable logic device is a member of the plurality of programmable logic devices;

obtain, based on setting a respective multiplexer select value of the different multiplexer select values, a code image from a second programmable logic device of the plurality of programmable logic devices; and validate the obtained code image from the second programmable logic device received by the management controller through the multiplexer in the first programmable logic device controlled according to the respective multiplexer select value.

18. The non-transitory machine-readable storage medium of claim 17, wherein the first programmable logic device comprises a scan chain to receive the code image from a scan chain of the second programmable logic device.

19. A method comprising:

populating, at a management controller, stored information comprising a plurality of device identifiers of programmable logic devices present in an electronic device;

receiving, at the management controller, a code image comprising program code to load into a given programmable logic device of the programmable logic devices, wherein the code image comprises multiplexer information and a device identifier of the given programmable logic device;

determining, by the management controller, whether the device identifier included in the code image matches a device identifier in the stored information;

based on determining that the device identifier included in the code image matches the device identifier in the stored information, programming, by the management controller, a multiplexer select value based on the multiplexer information in the code image, the multiplexer select value to control a multiplexer to connect an interface of the management controller to an interface of the given programmable logic device; and loading, by the management controller, the program code of the code image through the interface of the management controller, the multiplexer controlled by the multiplexer select value, and the interface of the given programmable logic device into the given programmable logic device.

20. The method of claim 19, further comprising:

setting, by the management controller, a further multiplexer select value in a first programmable logic device of the programmable logic devices to control a further multiplexer in the first programmable logic device;

issuing, by the management controller to the first programmable logic device, a command to retrieve a code image from a second programmable logic device of the programmable logic devices;

receiving, by the management controller from the first programmable logic device, the code image of the second programmable logic device that is steered by the further multiplexer in the first programmable logic device to the management controller; and validating, at the management controller, the code image of the second programmable logic device based on reading a stored signature associated with the code image of the second programmable logic device.

* * * * *